United States Patent
Hulbert

[11] Patent Number: 6,069,915
[45] Date of Patent: May 30, 2000

[54] RANDOMIZED CODE ACQUISITION

[75] Inventor: Anthony Peter Hulbert, Shirley, United Kingdom

[73] Assignee: Roke Manor Research Limited, United Kingdom

[21] Appl. No.: 08/895,431

[22] Filed: Jul. 16, 1997

[30] Foreign Application Priority Data

Jul. 23, 1996 [GB] United Kingdom .................... 9615460

[51] Int. Cl.[7] .............................. A61F 2/06; H04L 27/30
[52] U.S. Cl. .......................... 375/150; 375/149; 375/142; 375/367; 370/517
[58] Field of Search ..................................... 375/200, 208, 375/207, 354, 357, 367, 365, 373, 343, 349, 202, 203, 206, 130, 140, 142, 149, 150; 370/503, 507, 515, 517, 519

[56] References Cited

U.S. PATENT DOCUMENTS

| | | | |
|---|---|---|---|
| 4,278,978 | 7/1981 | Easterling et al. . | |
| 4,709,376 | 11/1987 | Kage . | |
| 4,896,336 | 1/1990 | Henely et al. ............................. | 375/80 |
| 4,964,138 | 10/1990 | Nease et al. ............................. | 375/200 |
| 5,463,660 | 10/1995 | Fukasawa et al. ....................... | 375/205 |
| 5,654,955 | 8/1997 | Natali ........................................ | 370/320 |
| 5,724,046 | 3/1998 | Martin et al. ............................. | 342/357 |
| 5,761,238 | 6/1998 | Ross et al. ................................ | 375/200 |
| 5,764,630 | 6/1998 | Natali et al. ............................. | 370/320 |
| 5,859,842 | 1/1999 | Scott ......................................... | 370/342 |

FOREIGN PATENT DOCUMENTS

0 726 658A2 of 1996 European Pat. Off. .
WO 95/24778 of 1995 WIPO .

*Primary Examiner*—Chi H. Pham
*Assistant Examiner*—Jean B. Corrielus
*Attorney, Agent, or Firm*—Evenson, McKeown, Edwards & Lenahan, P.L.L.C.

[57] ABSTRACT

A code acquisition circuit for acquiring code synchronization between an n-chip spreading code of a received spread spectrum radio signal and an n-chip local reference code generated by a code generator within a receiver, includes a variable delay means which operates to introduce a delay shift into the said received radio signal. A correlator operates to correlate n-chips of the local reference code with n-samples of the received signal communicated thereto, and generates a correlation signal representative of a result of the correlation. A code acquisition controller operates in combination with the correlation signal to maintain the delay shift for at least one correlation and thereafter to change the delay shift, wherein the delay shift is a fraction of one chip period.

29 Claims, 5 Drawing Sheets

RANDOMIZED CODE ACQUISITION

BACKGROUND OF THE INVENTION

The present invention relates to apparatus for acquiring code synchronisation between a spreading code of a received spread spectrum radio signal and a local reference code. More especially the present invention relates to apparatus for acquiring code synchronisation between a spreading code of a received spread spectrum radio signal and a local reference code, wherein there are time and frequency offsets between the received spread spectrum radio signal and the local reference code.

Furthermore, the present invention relates to a method for acquiring code synchronisation between a received spread spectrum radio signal and a local reference code, and, more especially, a method of acquiring code synchronisation wherein there are time and frequency offsets between the received spread spectrum radio signal and the local reference code.

Spread spectrum communications systems are provided with means for spreading the spectrum of data bearing radio signals before transmission by transmitters operating within the system. The spectrum of the data bearing radio signal is spread by providing a means whereby the signal is arranged to modulate a spreading code. In the case of direct sequence spread spectrum systems, data carried by a radio signal is represented as a sequence of symbols which are arranged to modulate an n symbol spreading code wherein each symbol of the n symbol code is known as a chip. Therefore each data symbol of the direct sequence spread spectrum signal is represented as a modulated version of the n-chip code which has the effect of increasing the transmitted data rate and therefore the signal band width by a factor in dependence upon the value of n.

To detect and recover the data communicated by the data bearing radio signal a receiver within the spread spectrum system must be provided with a means for despreading the signal in accordance with the spreading code used by the transmitter. To this end the receiver is provided with a means for generating a local reference version of the n-chip spreading code and a means for correlating this n-chip spreading code with the received signal. However, in order for the receiver to correctly despread the radio signal the n-chip local reference code must be arranged to be synchronised with the corresponding n-chips of the spreading code of the received radio signal, such that n-chips of the locally generated reference code are temporally aligned and therefore correlated against the corresponding n-chips in the received signal.

Known systems for acquiring synchronisation of a spreading code operate to correlate n-chips of the local reference code with n samples of a received signal, and compare a result of the correlation with a predetermined threshold. The samples of the received signal are taken in accordance with a chip rate of the spreading code. Where the result of the correlation exceeds the predetermined threshold, code synchronisation is deemed to have been acquired. Where however the correlation result is below the predetermined threshold a shift of the received signal is introduced with respect to the local reference code such that correlation with the received signal takes place one chip later. The correlation is thereafter repeated for all n-possible shifts of the received signal with respect to the reference code until the correlation result exceeds the predetermined threshold at which point synchronisation is deemed to have been acquired.

A problem with known systems for acquiring code acquisition as hereinbefore described, is that timing uncertainty exists for a signal sample representative of a chip of the received signal since this signal sample may be representative of any temporal position within a chip period. The temporal position of a signal sample within a chip period will hereafter be referred to as the chip timing. Where the chip timing is offset from an optimum position by as much as a half of one chip, a resulting loss of energy in the correlation can result in a significant degradation in a probability of exceeding the predetermined threshold even where the n-chips of the local code is otherwise synchronised with the code sequence in the receiver.

Where a spread spectrum signal has travelled over a rapidly changing distance between a transmitter and a receiver of the spread spectrum system, frequency as well as timing uncertainty in a received signal may occur as a result of, for example, doppler frequency offsets. A receiver of a spread spectrum signal must therefore also resolve a frequency appertaining to a frequency offset uncertainty between a carrier frequency of the received signal and a local oscillator used to generate a signal for demodulating the received spread spectrum signal.

It is an object of the present invention to provide a receiver with improvements in acquiring code synchronisation.

SUMMARY OF THE INVENTION

According to the present invention there is provided a code acquisition circuit for acquiring code synchronisation between an n-chip spreading code of a received spread spectrum radio signal and an n-chip local reference code generated by a code generator within a receiver of the said radio signal, the code acquisition circuit comprising a variable delay means which operates to introduce a delay shift into the said received radio signal, a correlator which operates to correlate n-chips of the local reference code with n-samples of the received signal communicated thereto, which samples are taken at sampling intervals determined by a chip timing position and a chip rate of the received signal, the correlator being provided with means for generating a correlation signal representative of a result of the correlation, and a code acquisition controller which operates in combination with the correlation signal to maintain the delay shift for at least one correlation, wherein the delay shift is a randomly selected fraction of one chip period, thereby providing a means whereby the chip timing position may be randomly varied.

By providing a variable delay means which operates to introduce a delay into the received signal in proportion to a randomly generated number, a randomly generated delay is introduced into the chip timing before correlation with the local reference code which has the effect that code acquisition is achieved in accordance with a probability of detection at a given timing offset, averaged over all timing offsets rather than having a condition wherein the probability of detection for the worst case timing offset can occur.

According to a first aspect of the present invention there is provided a method for synchronising an n-chip spreading code of a spread spectrum radio signal, to a local reference code comprises the steps of;

(i) correlating the n-chip local reference code with n corresponding samples of the received signal, which samples are taken at sampling intervals determined by a chip rate of the received signal and a chip timing position;

(ii) comparing a result of the correlation performed in step (i) with a pre-determined correlation threshold, and if the result exceeds the said threshold maintaining the chip-timing and a temporal correspondence of the said reference code to the received signal, the said method being complete, otherwise proceeding with step (iii);

(iii) temporally displacing the n-samples of the received signal by a period representative of one chip period;

(iv) repeating steps (i) to (iii), for each of n−1 possible chip displacements of the received signal with respect to the local reference code; and (v) introducing a random time offset into the chip timing position, and repeating steps (i) to (iv).

According to a second aspect of the present invention there is provided a code acquisition circuit for acquiring code synchronisation between an n-chip spreading code of a received signal and an n-chip local reference code generated by a code generator within a receiver of the said radio signal, the code acquisition circuit comprising a variable frequency offset means, which operates to introduce a frequency offset into the received signal in accordance with an offset control signal, and a correlator means which operates to generate a correlation signal representative of a result of correlating the frequency offset received signal with the said local reference code, and a code acquisition controller which operates to provide the offset control signal fed to the frequency offset means in dependence upon the correlation signal, wherein the frequency offset is changed after at least one correlation.

According to a third aspect of the present invention there is provided a code acquisition circuit for acquiring code synchronisation between an n-chip spreading code of a received signal and an n-chip local reference code generated by a code generator within a receiver of the said radio signal, the code acquisition circuit comprising a variable frequency offset means, which operates to introduce a frequency offset into the received signal in accordance with an offset control signal, a scaling means which operates to scale the frequency offset received signal by the local reference code, an accumulator which operates to generate a sub-correlation signal representative of an accumulated result of scaling the frequency offset signal by the said reference code for a predetermined correlation period, a shift register comprising a plurality of stages, each of which stages is arranged to store a sample of the sub-correlation signal communicated thereto, a discrete Fourier transformer which operates to generate a discrete Fourier transform of the plurality of samples of the sub-correlation signal stored in the shift register, a plurality of comparator means each of which comparator means operates to compare a magnitude of one of the Fourier transformed sub-correlation samples fed from the Fourier transformer with a predetermined threshold, and a code acquisition controller which operates independence upon comparison signals generated by the comparators to generate a frequency lock signal indicative of which of the Fourier transformed sub-correlations exceeded the predetermined threshold, and to provide the offset control signal fed to the frequency offset means in dependence upon the comparison signals, wherein the frequency offset is maintained for at least one correlation.

According to a fourth aspect of the present invention there is provided a method of acquiring frequency lock to a received spread spectrum radio signal, comprises steps of;

(i) generating a plurality of modulated versions of the received signal, by modulating the received signal with each of a plurality of de-modulating signals, each of which de-modulating signals has one of a set of pre-determined frequencies;

(ii) correlating a locally generated version of a spreading code used to spread the spectrum of the received signal, with each of the plurality of versions of the received signal;

(iii) comparing a result of the correlation performed in step (ii) with a pre-determined correlation threshold, and if the result exceeds the said threshold maintaining the frequency offset and the frequency of a de-modulating signal corresponding to the correlation result which exceeded the pre-determined threshold, the said method being complete, otherwise proceeding with step (iv);

(v) introducing a random frequency offset into the received signal, and repeating steps (i) to (iii).

According to a fifth aspect of the present invention there is provided a method of acquiring code synchronisation and frequency lock to a received spread spectrum radio signal, comprises the steps of;

(i) generating a plurality of modulated versions of the received signal by modulating the received signal with each of a plurality of de-modulating signals, each of which de-modulating signals has one of a set of pre-determined frequencies;

(ii) correlating the n-chip local reference code with n corresponding samples of each of the modulated versions of the received signal, which samples are taken at sampling intervals determined by a chip rate of the received signal and a chip timing position;

(iii) comparing a result of the correlation performed in step (ii) with a pre-determined correlation threshold, and if the result exceeds the said threshold maintaining the chip-timing and a temporal correspondence of the said reference code to the received signal, and maintaining the frequency offset and the frequency of a de-modulating signal corresponding to the correlation result which exceeded the said pre-determined threshold, the said method being complete, and if none correlation results in step (ii) exceeded the said threshold, proceeding with step (iv);

(iv) repeating steps (i) to (iii), for each of n−1 possible chip displacements of the received signal with respect to the local reference code;

(v) introducing a random time offset into the chip timing position, and repeating steps (i) to (iv), and (vi) introducing a random frequency offset into the received signal, and repeating steps (i) to (v).

Other objects, advantages and novel features of the present invention will become apparent from the following detailed description of the invention when considered in conjunction with the accompanying drawings.

DETAILED DESCRIPTION OF THE DRAWINGS

Figure 1:
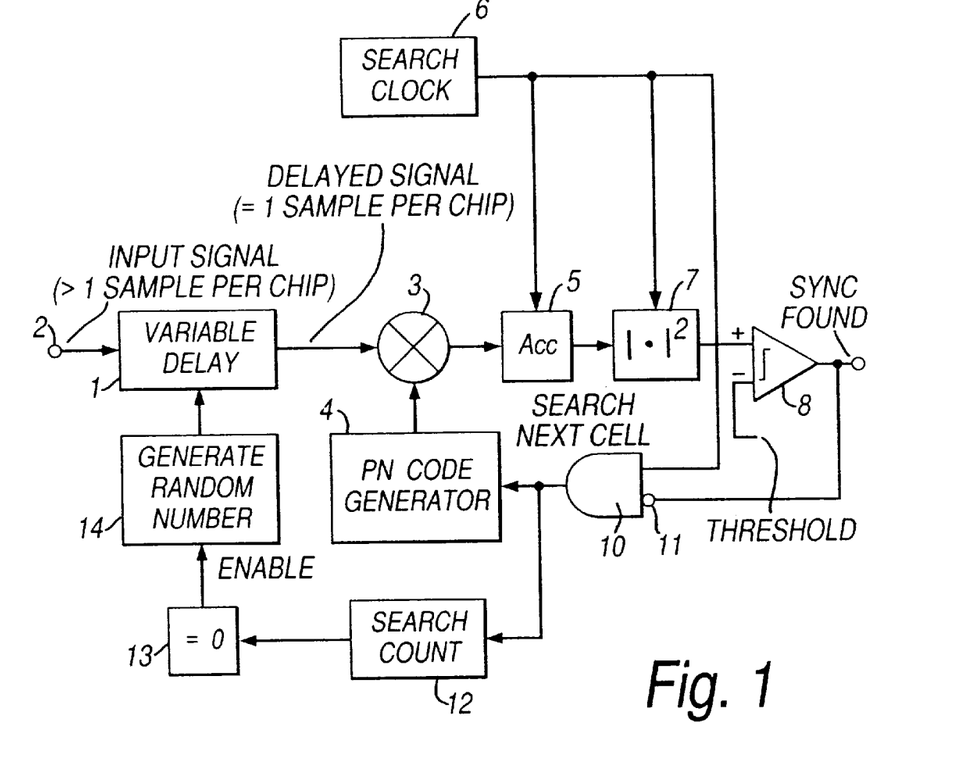
FIG. 1 is a block schematic diagram of a timing acquisition circuit in accordance with the present invention.

A receiver for detecting and recovering a direct sequence spread spectrum signal is typically provided with a means for detecting the transmitted signal and reducing the received version of that signal to a substantially base band frequency signal. Thereafter the received spread spectrum signal is despread. To this end the receiver is provided with a means for synchronising a locally generated reference code to that of the spreading code of the received signal. In FIG. 1 a circuit block diagram of an acquisition circuit for acquiring code synchronisation is shown. In FIG. 1 a received spread spectrum signal is fed to a variable delay means 1 via a conductor 2. A delayed version of the received signal is thereafter fed from the variable delay 1 to a first input of a multiplier 3. A second input of the multiplier 3 is fed with a signal from a code generator 4 connected thereto, which signal is representative of a local reference version of a spreading code used to spread the spectrum of the received radio signal. An output of the scaling multiplier 3 is fed to an accumulator circuit 5 which operates to sum signals generated at the output of the multiplier 3 over a predetermined search period. The search period is determined by a search clock 6 which generates a signal indicative of an end of the search period at an output fed to a second input of the accumulator 5 and also to a first input of an magnitude function 7. An output of the accumulator 5 feeds a second input of a magnitude function 7. An output of the magnitude function 7 is fed to a first positive input of a threshold detector 8 which operates to compare the output of the accumulator 7, with a predetermined threshold fed to a negative input of the threshold function 8. An output from the search clock 6 is also fed to a first input of an AND gate 10, a second inverting input of which is fed from the output of the threshold detector 8, via an inverting means 11. An output from the AND gate 10 is fed to an input of the code generator 4 and also to an input to a search counter 12. An output from the search counter 12 is fed to an input of a zero detector 13 an output of which is fed to a random number generator 14.

In operation the received signal is fed from the conductor 2, to the variable delay 1 which operates to introduce a delay into the received signal which is thereafter correlated by the multiplier 3 in combination with the accumulator 5 over a search period determined by the search clock 6. The received signal is sampled more than once per chip. In practice, the minimum sample rate is likely to be $\geq 2$ samples per chip. The variable delay block introduces a delay with a variable component in the range 0 to 1 chip (its total delay may be greater) and outputs samples once per chip. Correlation is achieved by multiplication with the local reference code generated by the code generator 4 which is applied to the second input of the multiplier 3. By accumulating a result of each multiplication a correlation result is determined which appears as a signal representative of the correlation result at the output of the accumulator 5. The magnitude of the correlation result fed from the accumulator 5 is thereafter calculated by the magnitude function 7 which is thereafter fed to the positive input of the threshold detector 8. The threshold detector 8 operates to compare the correlation result with a predetermined threshold fed to a negative input of the threshold detector 8 and when the correlation result exceeds the threshold a signal indicative of a result of this comparison is generated at the output 9 of the threshold detector 8, which is also fed to the second inverting input of the AND gate 10. The AND gate 10 operates to generate a signal indicative of the correlation result not exceeding the predetermined threshold at a time where the search clock indicates the beginning of the next search cycle. The signal generated by the AND gate 10 is thereafter fed to respective inputs of the code generator 4, and search counter 12. Search counter 12 serves to indicate the end of a search period. The search period corresponds to a period wherein a plurality of correlations are performed for each of a plurality of shifts of the received signal with respect to the reference code. At the end of the search period the code generator is reset to an initial sequence and correlation proceeds as before. Also, the search counter is reset to zero, where upon the number generator 14 is enabled to generate a new random number fed to the variable delay 1.

The arrangement of the timing acquisition circuit shown in FIG. 1 provides that a variable delay is introduced into the received signal for each correlation period. This variable delay may be implemented in a number of different ways. For example, if the input signal sample rate is k samples per chip, the variable delay could be a k–1 stage shift register with an k way selector to choose one of the possible outputs. The random number generator 14 operates to vary this delay in a random manner to the effect that chip timing is performed at a randomly selected point for each correlation period.

Figure 2:
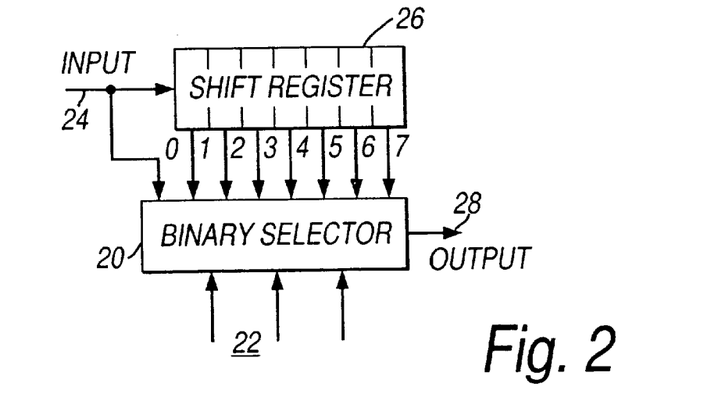
FIG. 2 is a block diagram of an apparatus for introducing a variable delay into an input signal.

A method of introducing a variable delay in accordance with a signal generated by the random number generator is shown in FIG. 2 where parts also appearing in FIG. 1 bear identical numerical designations. In FIG. 2 a binary selector 20 receives signals appertaining to the number generated by the number generator 14 via conductors 22. The received signal is fed via conductor 24 and clocked into a seven stage shift registers, each stage being representative of a delay corresponding to the sampling period of the received signal. Thereafter and in accordance with the number generated by the number generator 14, the binary selector 20, operates to select each of the signal samples of the received signal held in the shift register 26, which are clocked out via a conductor 28. By selecting signal samples from the shift registers 26 in accordance with the number generated and fed to the binary selector 20 signal samples are collected and clocked out on the conductor 28 in accordance with a delay represented by the number fed to conductors 22, which corresponds to a current 3 bit binary input. Hence, an output is generated once every k (=8) inputs, so the circuit decimates by k. Alternatively, the receiver may use an interpolating structure to derive the on chip samples. In this case, the variable delay is implemented as an interpolator. One possible implementation performs linear interpolation, using equation (1):

$$y_n = (1-\gamma)x_n + \gamma \cdot x_{n-1} \qquad (1)$$

where:

$y_n$ is the nth output of the interpolator $x_n$ is the nth input to the interpolator $\gamma$ is the interpolator coefficient If $\gamma=0$, then the output of the interpolator is the latest, i.e. $x_n$. If $\gamma=1$, the output of the interpolator is one sample delayed, i.e. $x_{n-1}$. Thus the delay increases linearly with $\gamma$. Usually, in a receiver using interpolators to derive chip timing, the value of $\gamma$ will be controlled by a numerically controlled oscillator generating a precise sawtooth waveform. When the interpolated coefficient value wraps to zero, an output of the interpolator will be generated for which no valid chip sample applies. The circuit will contain a control circuit which, at this point invalidates the samples. The output samples of the interpolator all correspond to samples at one chip intervals. However, they will appear at a rate related to the input sample rate. Some of the interpolator outputs will carry no samples so that on average, the valid output sample rate is equal to the chip rate.

The delay can be randomised in such a circuit by adding a random value to the current value of $\gamma$. If the required random delay exceeds the input sample period then an additional delay can be obtained by delaying the input by one or more samples. There is a subtle difference between the effect of the delay in the above two variable delay implementations. In the former, the specified delay is an absolute, non cumulative value. In the case of the interpolating delay the specified delay is added to the existing delay value. In the latter case it may be permissible to restrict the range of the added delay to between 0 and ½ chip. This is not ideal, however, since the minimum signal timing error is not entirely uncorrelated between scans.

Referring to FIG. 1, the chip sequence, which in general will be complex, is fed to the multiplier 3, (also usually complex) where it is multiplied by the local code as generated by the reference code generator 4. The output of the multiplier 3 is accumulated over the correlation period by the accumulator 5 which will generally be complex. The correlation period is defined by successive rising edges of the search clock 6. Following each rising edge, the output of the accumulator is processed in the magnitude function 7, which operates to calculate the magnitude of the accumulated signal fed from the accumulator 5 is reset to zero. If the energy exceeds the predetermined threshold then synchronisation is deemed to have been found and further searching is inhibited. Otherwise the search clock output is fed to code generator 4, which indicates the code is to be advanced. If the signal being acquired is unmodulated, the code is advanced by one chip. If the signal being acquired is modulated, however, it is necessary that all correlation operations are synchronised exactly to a code epoch of a symbol. Such a code epoch of a symbol is hereafter referred to as a cell. Correlation is shifted with respect to the next cell in this case, therefore, by correspondingly shifting the received signal samples. Either way, the next cell can be searched in this way.

If the code has a length equal to n, it is necessary to search n cells. The search counter 12, which is a modulo counter with count cycle size n, serves to monitor a current position in the search cycle. When the output of the counter 13 reaches zero, the zero detector 13 detects this event and enables the random number generator 14, to produce a new random number. This new number is passed on to the variable delay one to randomise the delay ready for the next code phase scan cycle. The random number generator 14 can be implemented very simply using, for example, a maximal length sequence (M-sequence) generator. A generator based on a 10 stage shift register would have a repeat cycle of 1023 which should be adequate. The variable delay 1, shown in FIG. 2, could be controlled by taking the outputs of any three stages of the shift register of such an M-sequence generator.

Serial implementations of code acquisition circuits frequently incorporate several phases of validation as part of the acquisition procedure. For example, the process for acquiring code synchronisation provided by the circuit in FIG. 1 might correspond only to an initial acquisition in a more complex receiver implementation. This would be followed by further correlations on the same code phase to provide greater confidence that the correlation energy exceeded the predetermined threshold, as a result of correctly received signal rather than random fluctuations in noise. The further correlations could be added to the basic architecture of FIG. 1, without altering the fundamental operation of the randomising component. The additional validation phases would usually result in a scan taking a longer, and somewhat indeterminate period as additional correlations were performed to make it possible to dismiss false initial detections. Nevertheless, it will be possible to determine when the scan is complete and apply the randomisation of code phase timing.

Figure 3:
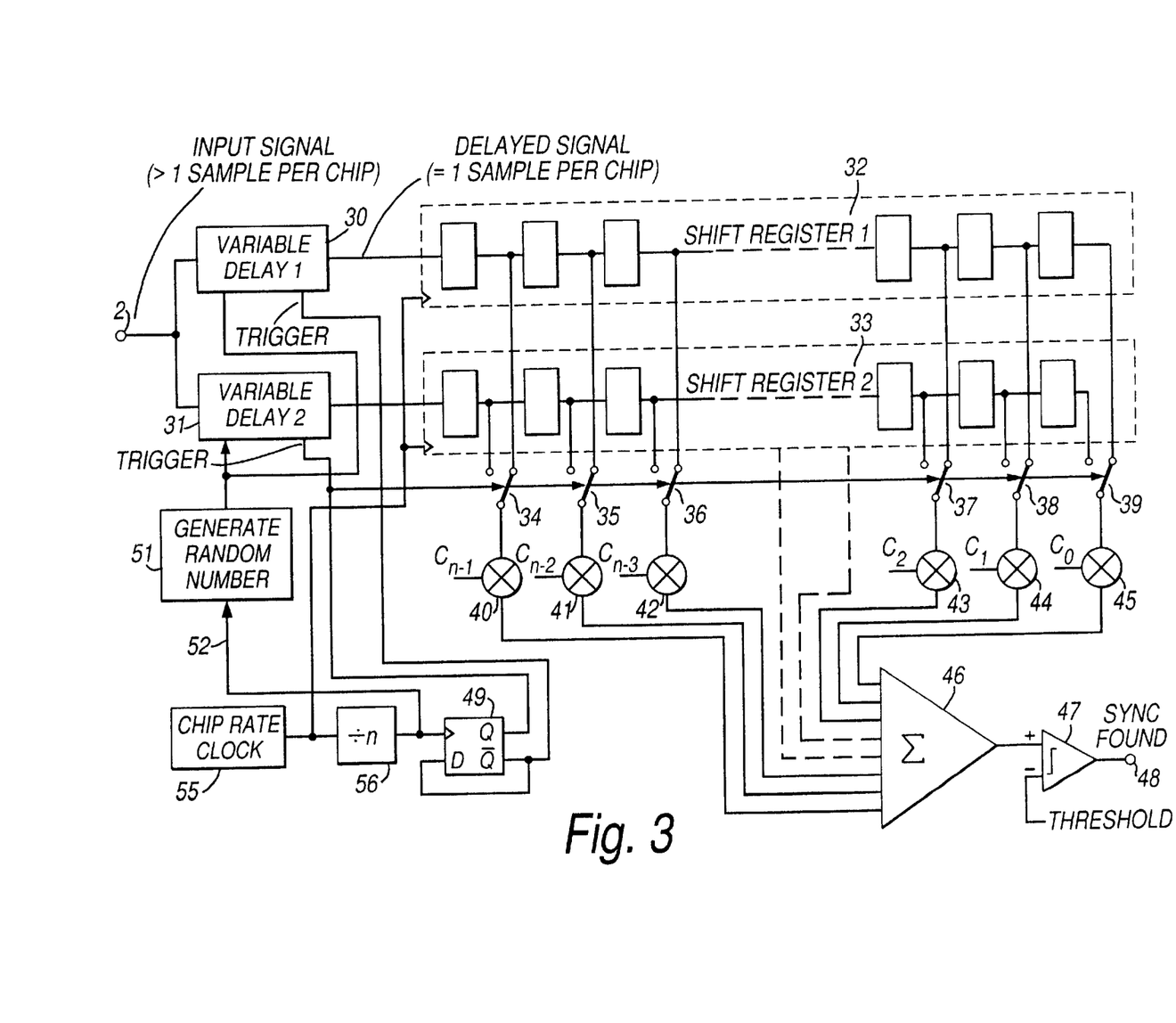
FIG. 3 is a schematic block diagram of a circuit for timing acquisition and despreading incorporating a form of a digital match filter.

The timing acquisition circuit shown in FIG. 1 operates to perform a serial correlation of the received signal with the locally generated reference code. A parallel implementation of such a code acquisition and timing circuit is shown in FIG. 3, where parts also appearing in FIGS. 1 and 2 bear identical numerical designations. In FIG. 3 the received signal is fed via a conductor 2 to respectively first inputs of two variable delays, variable delay one and variable delay two, 30, 31. An output of variable delay one, 30 and variable delay two, 31 are respectively fed to first and second shift registers 32, 33. The first and second shift registers are each comprised of a plurality of stages, and an output from each stage is presented at an input to a plurality of controllable switches 34, 35, 36, 37, 38, 39. Each output of each of the plurality of switches is fed to an input of each of the plurality of multipliers as 40, 41, 42, 43, 44 and 45. A second input of each of the plurality of multipliers is fed with a signal representative of one chip of the n-chip spreading code where each chip is designated $c_i$, where i is in the range n−1 to 0. An output of each of the plurality of multipliers 40, 41, 42, 43, 44, 45, is fed to a summer 46, an output of which is fed to an input of a threshold detector 47. The threshold detector 47, operates to compare the output of the summer represented of a summation of the output signals from the plurality of multipliers, with the predetermined threshold. An output signal representative of this comparison is presentated at an output terminal 48. A second input of the first and second variable delay means 31, 3 2 is fed by Q and $\overline{Q}$ outputs from a D type flip-flop 49 respectively. The clock input of the D type flip-flop is fed with a signal derived divided by a n divider 53, which has representative from a chip rate clock 55, of the spread spectrum signal 50. An output from the chip rate clock 55, is also fed to first and second input clocks of the shift registers 32, 33. The divide by n output fed to the clock input of the D type flip flop 49 is also fed to an input of the number generator 51 by a conductor 52. An output of the number generator 51 is fed to a first input of the variable delay 31 and the variable delay 30.

The timing acquisition circuit shown in FIG. 3 provides a digital matched filter implementation for correlating the local reference code with the received signal. This is achieved by parallel multiplication of a version of the received signal with the locally generated reference code fed to the multipliers 40, 41, 42, 43, 44, 45. The received signal is fed to the two variable delays 30, 31, which operate to introduce a delay into the received signal in accordance with a number generated by the random number generator 51, fed via conductors communicated thereto. Each delayed received signal is thereafter respectively fed to the first and second delay shift registers 32, 33, which operates to clock the received signal into the shift registers at the chip rate determined by the chip rate clock 55. The respective outputs from each of the shift registers is thereafter multiplied via the switches 34, 35, 36, 37, 38, 39, by corresponding chips of the n-chip code $c_i$, and the results of the multiplications summed by the summer 46. The summed multiplication presented at the output of the summer 46 is representative of a result of correlating the received signal by the spreading code. The output of the summer 46, is fed to the positive input of the threshold detector 47 which operates to indicate whether code synchronisation has been acquired. The code acquisition and digital match filter arrangement shown in FIG. 3 is therefore provided to effect a parallel implementation of the timing acquisition circuit in serial form shown in FIG. 1.

In parallel implementation of a code acquisition system, many correlators are implemented, one for each code phase of the signal. In fact the architecture can be viewed as a digital filter, matched to the code. FIG. 3, shows one possible implementation of a parallel initial acquisition circuit incorporating timing randomisation. In this implementation, two variable delays 30, 31, are provided. Their implementation may correspond to either of those described earlier. These feed two corresponding shift registers 32, 33. Controllable switches 34, 35, 36, 37, 38, 39, at the output of the shift registers 32, 33, select one or other of the shift registers to feed the multipliers 40, 41, 42, 43, 44, 45. The multipliers multiply the various delayed signal inputs by each of the chips of the code sequence (or code segment if the code sequence length exceeds the integration period). Thus, after every chip period, a new correlation of the code against the previous n chips is formed. The variable delay associated with the correlation will have been provided either by variable delay 1, 30 or variable delay 2, 31, depending on the state of the switches. When a correlation result exceeds a predetermined threshold, chip timing is deemed to have been acquired and the code of the received signal thereby synchronised with the local code.

Control of the code synchronisation circuit shown in FIG. 3 is provided by means of a chip rate clock 55, in combination with the D-type flip-flop 49. The chip rate clock serves to clock the shift registers as shown and is also fed to a divide by n circuit which provides a rising edge once every code period. This rising edge performs two functions. Firstly, it triggers the random number generator 51, to output a new random number. Secondly, it drives a symmetrical divide by two circuit implemented using the D-type flip-flop 49. The first and second variable delays 30, 31, are designed using conventional latching techniques to respond to a change in the random number provided by the number generator 51, the signal provided on the rising edge of the Q and Q outputs of the D-type flip-flop 49, respectively. The variable delays are triggered by opposite polarities of the divide by two circuit output, therefore the delays will be updated at different times. One of the delays will be updated every code period, but each delay will be updated only once every two code periods.

The control of the controllable switches 34, 35, 36, 37, 38, 39, is also from the output of the flip-flop 49. The controllable switches will remain connected to one shift register for a whole code period and then switch inputs to the other shift register for a whole code period and so on. The phasing is arranged such that the switches connect to the first shift register 32, immediately after n delayed signal samples have been received after a change in the delay introduced by variable delay one, 30. This has the effect that, during a period in which correlation is performed using outputs from the first shift register 32, all received signals samples of the first shift register 32, will have experienced the same delay from the first variable delay 30. A similar situation is effected for the second variable delay 31, and second shift register 33.

Figure 4:
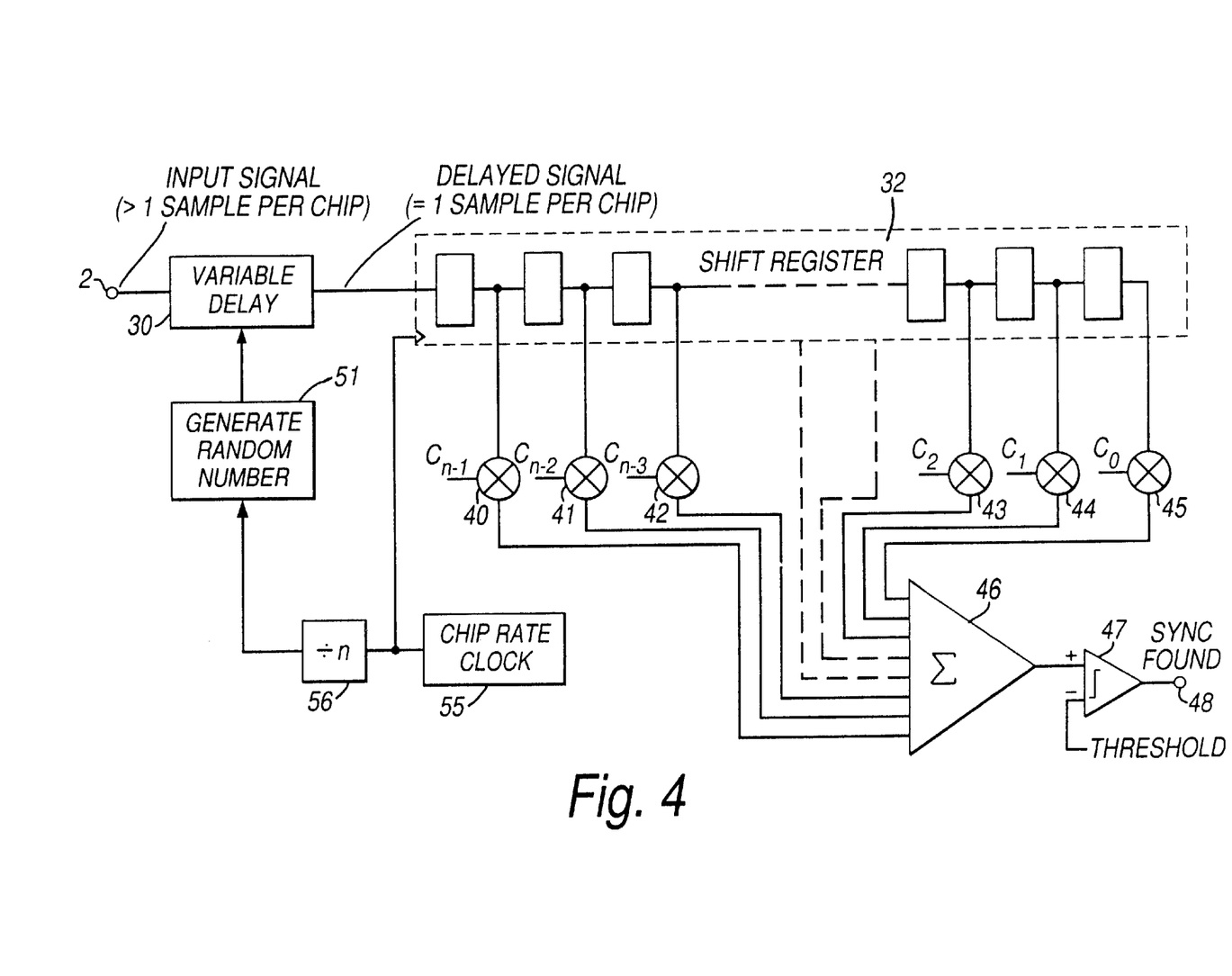
FIG. 4 is a schematic block diagram of a simplified circuit for timing acquisition and despreading incorporating a form of a digital match filter.
Figure 5:
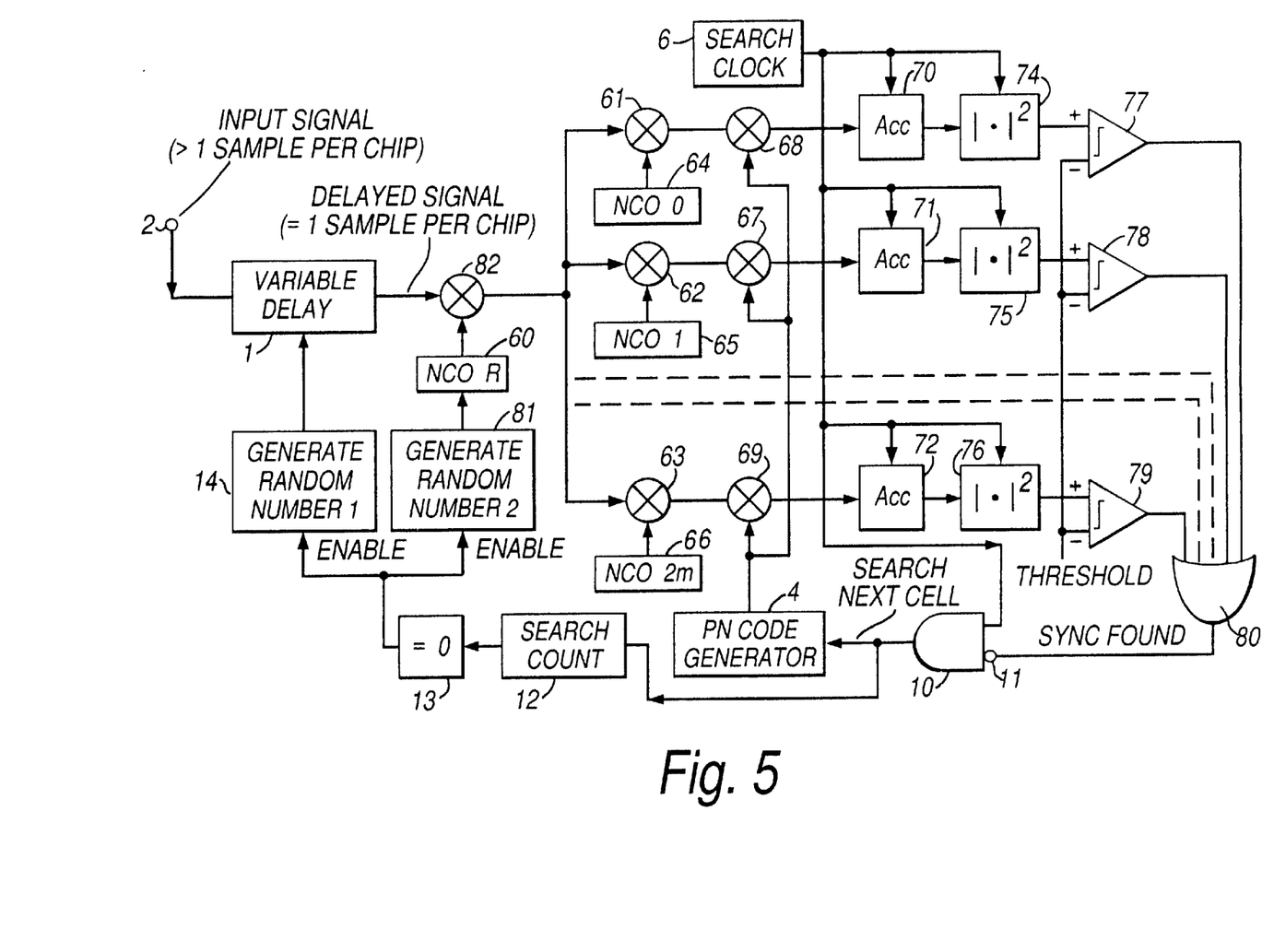
FIG. 5 is a schematic block diagram of a combined time and frequency acquisition circuit in accordance with the present invention, and, FIG. 6 is a schematic block diagram of a time and frequency acquisition circuit embodying an FFT correlator.

The timing acquisition circuit shown in FIG. 3 is provided with two variable delay means 30, 31, and corresponding shift registers 32, 33, so as to accommodate a situation where the delay is produced by the random number and variable delay means is changing as the signal is being clocked into the shift registers. This arrangement provides for correlation in parallel of the received signal and the locally generated reference code and provides that the delay introduced by either of the two variable delay means 30, 32, is maintained throughout the correlation period. In order to mitigate against a problem where the variable delay changes during the correlation period, two variable delays are provided so that when switching between delays, the switches 34, 35, 36, 37, 38, 39, controlled by a control line fed from the Q output of the D type flip-flop 49 operates to ensure that only one of the delay shift registers 32, 33, is used to generate the correlation result. In this way parallel implementation of the timing acquisition circuit is effected without introducing errors by having different chip timings contribute to a correlation result. In the case however where application of the timing acquisition circuit is such that the errors introduced by having different chip timings to generate a correlation result is not considered critical in a particular application, the parallel implementation of the timing acquisition circuit shown in FIG. 3 can be simplified to that shown in FIG. 4 where parts also appearing in FIG. 3 bear identical numerical designations. In fact FIG. 4 is the same as FIG. 3 but with one variable delay 31, and one shift register 33 removed with the plurality of switches also being removed as these are redundant. The D type flip-flop 49 is also removed since these components were required in order to effect the switch over in chip timing versions. Explanation of the circuit presented in FIG. 4 is therefore as for FIG. 3 but without the need to switch over to different chip timings at the end of a correlation period. Correlation is therefore effected by a change in chip timing which may occur as a result of the change in random timing offset generated by the random number generator 51. The timing is updated once per code phase. In general, the contents of the shift register will include some samples corresponding to the old delay and some corresponding to the new. The energy at the output of the correlator near to the correct phase will be an average of the energies applicable for the two delays, weighted according to the proportions of chips contained within the shift register which correspond to the two delays.

Where effects during transmission serve to introduce a frequency ambiguity into the carrier signal as acquired by the receiver a frequency acquisition circuit combined with a timing acquisition circuit is required. FIG. 5 presents a time and frequency acquisition circuit wherein time acquisition is performed in a serial fashion as according to FIG. 1 and accompanying explanation, whereas frequency acquisition is performed in parallel. In FIG. 5 the received signal is once again fed via a conductor 2 to a variable delay 1. The variable delay thereafter feeds a multiplier 82 with a signal which has been delayed in accordance with a random delay selected via the number generator 14. Also fed to a second input of the multiplier 82 is a frequency offset generated by the selectable variable frequency oscillator 60. The delayed and frequency shifted version of the received signal is generated by the multiplier 3 and fed respectively to a first input of each of a plurality of multipliers 61, 62, 63. A second input of each of the plurality of multipliers 61, 62, 63, is fed from a local oscillator 64, 65, 66. An output from each of the respective multipliers 61, 62, 63 is thereafter fed to a further multiplier 67, 68, 69, an output of which is fed respectively to each of a plurality of accumulators 70, 71, 72. A second input of each of the second multipliers 67, 68, 69, is fed with a signal from a code generator 4. A second input to each of the accumulators 71, 72, 73 is fed with a signal generated by a search clock 6 which is also fed to a first input of each of a plurality of magnitude functions 74, 75, 76, which respectively form the magnitudes of the signals presented at the output of each of the accumulators 70, 71, 72. An output of each of the magnitude functions 74, 75, 76, is fed to a first input of each of a corresponding plurality of threshold detectors 77, 78, 79. A predetermined threshold is fed to an inverting input of each of the plurality of threshold detectors 77, 78, 79. An output of the plurality of threshold detectors is fed to an OR gate 80 an output of which is fed to an inverting input of an AND gate 10. A second input of the AND gate 10 is fed by the search clock 6. An output of the AND gate 10 is fed to an input of the code generator 4 and also to an input of the search counter 12. An output of the search counter 12 feeds a zero detector 13, an output of which is fed to a first input of a first random number generator 14 and a first input of a second random number generator 81. An output of the second random number generator 81 is fed to the selectively variable voltage control oscillator 60.

The embodiment of a code synchronisation and frequency offset acquisition circuit shown in FIG. 5 is provided with a serial code acquisition circuit and a parallel frequency tracking circuit wherein randomisation of both time and frequency are embodied.

Apart from the addition of parallel frequency tracking and frequency randomisation, the architecture is essentially the same as that of FIG. 1. Therefore, the operation of the code synchronisation circuits appertaining to the code correlators is as for FIG. 1. In operation, the received signal passes through the initial variable delay, and thereafter a frequency offset with randomly determined value is applied by means of the complex mixer and numerically controlled oscillator (NCO R) 60. The signal is split thereafter into 2m+1 paths, one for each frequency bin, where each frequency bin comprises one of the oscillators 64, 65, 66, and associated code acquisition circuit. For each frequency bin there is an NCO 64, 65, 66, defining the relevant frequency offset. For example, if the correlation period is T seconds, the maximum (and probably optimum) frequency bin spacing is 1/T Hz. The frequencies would then typically be arranged with NCO 0 on frequency −m/T, NCO m on zero frequency (in fact this would implemented as a through path with no multiplier or NCO) and NCO m on frequency m/T. The range of random frequency inputs to NCO R would then be ±½T. The value of m would be chosen such that ±m/T covered the entire frequency range uncertainty.

The output of each numerically controlled oscillator (NCO) feeds an independent multiplier and accumulator, all fed from the same local reference code generator 4. Each finger associated with a frequency bin operates thereafter to correlate the frequency shifted received signal with the local reference code. When any one of these exceeds a threshold, the OR gate 80, provides a signal indicative of synchronisation having been acquired. The threshold detector associated with a frequency bin which indicated that the correlation result had exceeded the predetermined threshold therefore provides the frequency offset on which the signal was found. If none of the correlation results indicate that the predetermined threshold has been exceeded, the search clock output feeds on to the code generator 4, to indicate that the next cell should be searched. The control operations are applied in exactly the same way as described for FIG. 1. The only difference is that, when randomising is applied to the timing, it is also applied to the carrier frequency offset NCO R. This frequency offset is applied to each of the versions of the received signal fed to the frequency bins. Note that an alternative implementation would delete the first frequency convertor and add a randomly determined quantity to the frequency values for each of the NCOs in parallel. At each new randomisation, the old random quantity would need to be removed before addition of the new random quantity. Thus it would be necessary to store both the current actual frequency and the nominal frequency.

The effects of timing and frequency error are largely decoupled. As such it is possible to merge the two random number generators 14, 81, into a single random number generator. It is not expected that any significant performance degradation would result.

In the same way as for the serial acquisition circuit without frequency searching, it is possible and generally desirable, to add further validation phases during frequency searching. The above approach can equally well be applied when this is done.

Figure 6:
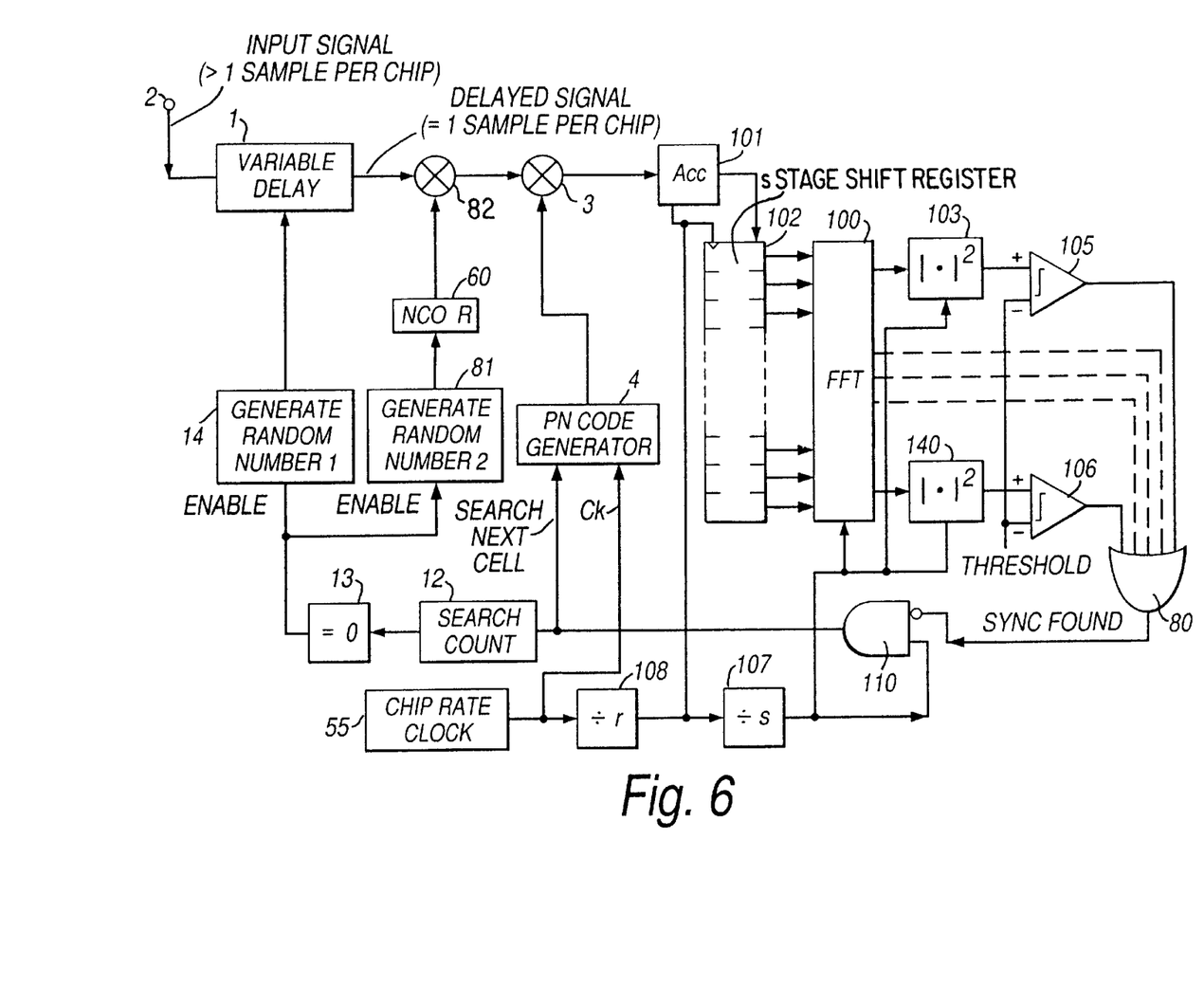

An alternative, and more efficient, approach to searching in the frequency domain makes use of an FFT Correlator which is a known correlator, described in two papers, 'Rapid Acquisition Concept for Voice Activated CDMA', by M K Sust et al, published at IEEE Globecom 1990, and 'Code and Frequency Acquisition for Fully Digital CDMA—VSATS', also by R K Sust et al, published at IEEE Globecom 1991. A schematic block diagram of a time and frequency acquisition system embodying an FFT correlator, is shown in FIG. 6. The operation of the circuit, shown in FIG. 6, apart from the FFT Correlator 100 is substantially the same as that of FIG. 5.

In FIG. 6, the received signal is fed via a conductor 2 through the variable delay 1 to a multiplier 82. The variable delay 1, operates to introduce a delay into the received signal in accordance with a number generated by the random number generator one, 14, as hereinbefore described with reference to the circuit shown in FIG. 1. The multiplier 82 operates to offset the frequency of the received signal by a random amount in accordance with a random number generated by random number generator 2, 81, as hereinbefore described with reference to the frequency tracking circuit shown in FIG. 5. Thereafter, the signal is correlated against the local reference code by a multiplier 3, a result of which is accumulated by an accumulator 101 in accordance with a correlation period determined by a chip rate clock 55. Thereafter, each of the accumulated signals is fed to an S stage shift register 102. An output from each stage of the S stage shift register is fed to an input of a Discrete Fourier Transformer 100 operates to perform a fast Fourier transform (FFT), wherein each output corresponds to a frequency offset or frequency bin introduced into the received signal. A result of the Fourier transform is communicated via a plurality of conductors, each of which plurality of conductors corresponds to the S conductors presented at the input to the Discrete Fourier Transformer 100. Each of the output conductors of the Fourier Transformer 100 feeds one of a corresponding plurality of magnitude functions 103, 104, an output of each of which feeds one of a corresponding plurality of threshold detectors 105, 106. Each of the threshold detectors 105, 106, operates to compare the output signal from the corresponding magnitude function 103, 104, with a predetermined threshold and generates a result indicative of whether the magnitude function output signal exceeds the predetermined threshold, and which outputs are fed to the OR gate 80. A clock input of the Discrete Fourier Transformer 100 and each of the plurality of magnitude functions 103, 104, is fed from a divide by S unit 107, which derives a signal from the chip rate clock 55, via a divide by R unit 108. A clock input of the shift register 102, is fed from an output of the divide by R unit 108.

The Discrete Fourier Transformer 100, operates to introduce a corresponding set of frequency offsets, which were provided by the NCO shown in FIG. 5. Following the initial randomisation in the times and frequency domains, the received signal is sampled at the chip rate and is multiplied by the local code from the code generator 4. The output from the code generator 4, is accumulated in groups of r chips by the accumulator 101. The output of the accumulator is shifted into the s stage shift register 102 and reset to zero. After r×s chip rate clock cycles, the s stage shift register will contain s new sub-correlations, each corresponding to r chips. We arrange that n=r×s, where n is the correlation period of the code. The FFT produces s outputs, adjacent outputs corresponding to a frequency offset difference of 1/T where T is the time period corresponding to the transmission of n chips. The energy on each of the outputs of the FFT is computed by each of S magnitude functions 103, 104, and compared against a predetermined threshold by S threshold detectors 105, 106. If any exceeds the threshold the synchronisation state has been found. Otherwise the output of the divide by s circuit (the search clock) feeds on to the code generator 4 and indicates that the next cell should be searched. The operations of the randomising elements is exactly as described previously.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for synchronizing an n-chip spreading code of a received spread spectrum radio signal to a local reference code, the method comprising the steps of:

(i) correlating said n-chip local reference code with n corresponding samples of said received signal, said samples being taken at sampling intervals determined by a chip rate of said received signal and a chip timing position;

(ii) comparing a result of said correlation performed in step (i) with a pre-determined correlation threshold, and providing an output signal indicative of said comparison;

(iii) temporally displacing said n-samples of said received signal by a period representative of one chip period if said threshold has not been exceeded;

(iv) introducing a random time offset into said chip timing position; and (v) repeating steps (i) to (iv) for each of n−1 possible chip displacements of said received signal with respect to said local reference code until said threshold has been exceeded.

2. A code acquisition circuit for acquiring code synchronization between an n-chip spreading code of a received signal and an n-chip local reference code generated by a code generator within a receiver of said radio signal, said code acquisition circuit comprising:

variable frequency offset means for introducing a frequency offset into said received signal in accordance with an offset control signal, scaling means for scaling a frequency offset received signal by said local reference code, accumulator means for generating a sub-correlation signal representative of an accumulated result of scaling said frequency offset signal by said reference code for a predetermined correlation period, shift register means comprising a plurality of stages, each stage being arranged to store a sample of said sub-correlation signal communicated thereto, discrete Fourier transformer means for generating a discrete Fourier transform of said sample of said sub-correlation signal stored in each stage of said shift register means, a plurality of comparator means for comparing a magnitude of respective ones of said Fourier transformed sub-correlation samples with a predetermined threshold, and frequency acquisition controller means for generating a frequency lock signal in dependence upon comparison signals generated by said comparator means, said frequency lock signal being indicative of which of said Fourier transformed sub-correlation samples exceeds said predetermined threshold, said frequency acquisition controller means providing said offset control signal fed to said frequency offset means in dependence upon said comparison signals, said frequency offset being maintained for at least one correlation period.

3. A code acquisition circuit as claimed in claims 2, wherein said frequency acquisition controller means comprises a random number generator for generating a random number, said offset control signal being produced in accordance with said generated random number.

4. A code acquisition circuit as claimed in claim 2, wherein said variable frequency offset means comprises further frequency scaling means for scaling said received signal received at a first input thereof with a frequency offset signal applied to a second input thereof, said frequency offset signal being generated by a controllable oscillator arranged to provide said frequency offset signal in dependence upon said offset control signal applied thereto.

5. A code acquisition circuit as claimed in claim 2, further comprising variable delay means for introducing a delay shift into said received radio signal in accordance with a time control signal fed thereto from said frequency acquisition controller means and arranged to maintain said delay shift for at least one correlation period to provide both code and frequency acquisition.

6. A method of acquiring code synchronization and frequency lock of a received spread spectrum radio signal to a local n-chip reference code, the method comprising the steps of:

(i) generating a plurality of demodulated versions of said received signal by demodulating said received signal with each of a plurality of de-modulating signals, each de-modulating signal having one of a set of pre-determined frequencies;

(ii) correlating said n-chip local reference code with n corresponding samples of each of said demodulated versions of said received signal, said samples being taken at sampling intervals determined by a chip rate of said received signal and a chip timing position;

(iii) comparing a result of said correlation with a pre-determined correlation threshold and providing an output signal indicative of said comparison;

(iv) introducing a random time offset into said chip timing position;

(v) introducing a random frequency offset into said received signal, and (vi) repeating steps (i) to (v) for each or n−1 possible chip displacements of said received signal with respect to said local reference code until said threshold has been exceeded.

7. A method of acquiring code synchronization and frequency lock as claimed in claim 6, wherein steps (iv) and (v) are performed contemporaneously.

8. A code acquisition circuit for acquiring code synchronization between an n-chip spreading code of a received radio signal and an n-chip local reference code generated by a code generator within a receiver of said radio signal, the code acquisition circuit comprising:

variable frequency offset means for introducing a frequency offset into said received signal in accordance with an offset control signal, correlator means for generating a correlation signal representative of a result of correlating a frequency offset received signal with said local reference code during a correlation period, frequency acquisition controller means for providing said offset control signal for said frequency offset means in dependence upon said correlation signal, said frequency offset being changed after at least one correlation period, correlation comparator means for comparing said correlation signal with a pre-determined correlation threshold and for generating a frequency lock signal representative of a result of said correlation and indicative of said correlation signal exceeding said correlation threshold, frequency locking means for maintaining said frequency offset for said received signal in accordance with said frequency lock signal, and discrete frequency shifter means connected to said variable frequency offset means for generating a plurality of frequency shifted versions of frequency offset received signals, each frequency shifted version being representative of said frequency offset received signal shifted in frequency by one of a plurality of predetermined frequencies, said correlator means generating said correlation signal representative of a result of correlating each frequency shifted version of said received signal with said locally generated reference code.

9. A code acquisition circuit as claimed in claim 8, wherein said frequency acquisition controller means comprises a random number generator which generates a random number, said offset control signal being produced in accordance with said generated random number.

10. A code acquisition circuit as claimed in claim 8, wherein said variable frequency offset means comprises frequency scaling means for scaling said received signal present at a first input thereof with a frequency offset signal applied to a second input thereof, said frequency offset signal being generated by a controllable oscillator in dependence upon said offset control signal applied thereto.

11. A code acquisition circuit as claimed in claim 8, wherein said frequency lock signal is indicative of said frequency offset and of said frequency shifted versions of said frequency offset received signal exceeding said correlation threshold, and said frequency locking means operates in accordance with said frequency lock signal to maintain said frequency offset and frequency shift of said received signal.

12. A code acquisition circuit as claimed in claim 8, wherein said discrete frequency shifter means comprises a plurality of scaling means connected to said variable frequency offset means, each scaling means scaling said frequency offset received signal with one of a plurality of demodulating signals, each demodulating signal being generated by one of a plurality of oscillators at one of said plurality of pre-determined frequencies.

13. A code acquisition circuit as claimed in claim 12, wherein said correlator means comprises a plurality of correlators connected to said discrete frequency shifter means, each correlator comprising second scaling means for scaling each frequency shifted version of said frequency offset received signal by said locally generated reference code, accumulator means for generating an accumulation signal representative of accumulating said scaled frequency shifted version of said frequency offset received signal for a pre-determined correlation period, and magnitude calculation means for generating a magnitude signal representative of said accumulated result of scaling said frequency shifted version of said frequency offset received signal by said reference code.

14. A code acquisition circuit for acquiring code synchronization between an n-chip spreading code of a received radio signal and an n-chip local reference code generated by a code generator within a receiver of said radio signal, the code acquisition circuit comprising:

variable frequency offset means for introducing a frequency offset into said received signal in accordance with an offset control signal, correlator means for generating a correlation signal representative of a result of correlating said frequency offset received signal with said local reference code during a correlation period, frequency acquisition controller means for providing said offset control signal for said frequency offset means in dependence upon said correlation signal, said frequency offset being changed after at least one correlation period, and variable delay means for introducing a delay shift into said received radio signal in accordance with a time control signal fed thereto from a code acquisition controller means and arranged to maintain said delay shift for at least one correlation period to provide both code and frequency acquisition.

15. A code acquisition circuit as claimed in claim 14, wherein a correlation comparator means further generates a code lock signal indicative of said delay shift appertaining to said correlation signal exceeding said pre-determined threshold.

16. A code acquisition circuit as claimed in claim 15, further comprising code locking means for maintaining said delay shift in dependence upon said code lock signal.

17. A code acquisition circuit for acquiring code synchronization between an n-chip spreading code of a received spread spectrum radio signal and an n-chip local reference code generated by a code generator within a receiver of said radio signal, the code acquisition circuit comprising:

variable delay means for introducing a delay shift into said received radio signal, said delay shift being a randomly selected fraction of one chip period for randomly varying chip timing position of said received radio signal;

correlator means for correlating n-chips of the local reference code with n-samples of said delayed received signal, said n-samples being taken at sampling intervals determined by said chip timing position and a chip rate for said delayed received signal, said correlator means being provided with means for generating a correlation signal representative of a result of said correlation, said correlator means comprises scaling means for generating a product signal representative of scaling said delayed received signal fed to a first input thereof by said local reference code fed to a second input thereof, accumulator means for generating an accumulation signal representative of accumulating said product signal over a predetermined period, magnitude calculation means for generating a magnitude signal representative of said accumulation signal at the end of said predetermined period, and comparison means for comparing said magnitude signal with a predetermined threshold to generate said correlation signal; and code acquisition controller means for maintaining said delay shift in dependence upon said correlation signal.

18. A code acquisition circuit as claimed in claim 17, wherein said pre-determined period is substantially equal to a duration appertaining to temporal length of said n-chip spreading code.

19. A code acquisition circuit for acquiring code synchronization between an n-chip spreading code of a received spread spectrum radio signal and an n-chip local reference code generated by a code generator within a receiver of said radio signal, the code acquisition circuit comprising:

variable delay means for introducing a first delay shift into said received radio signal, said first delay shift being a randomly selected fraction of one chip period for randomly varying chip timing position of said received radio signal;

correlator means for correlating n-chips of the local reference code with n-samples of said delayed received signal, said n-samples being taken at sampling intervals determined by said chip timing position and a chip rate for said delayed received signal, said correlator means being provided with means for generating a correlation signal representative of a result of said correlation, said correlator means comprising first shift register means having a plurality of stages for providing a sample of said delayed received signal at an output of said plurality of stages in dependence upon a chip rate clock and said samples of said received signal fed thereto; a plurality of scaling means each having a first input connected to the output of one of the stages of said first shift register means for scaling said received signal sample provided at the output of one of said stages with a sample representative of a chip of said local reference code provided at a second input thereof, and summer means connected to an output of each of said scaling means for generating said correlation signal in accordance with a sum of said scaled samples of said received signal; and code acquisition controller means for maintaining said delay shift in dependence upon said correlation signal.

20. A code acquisition circuit as claimed in claim 19, further comprising second variable delay means for introducing a second delay shift into said received radio signal, said second delay shift being a randomly selected fraction of one chip period for randomly varying chip timing position of said received signal, second shift register means having a plurality of stages for providing a sample of said received signal at an output of each stage in dependence upon said chip rate clock and said samples of said delayed received signal delayed by said second variable delay means which are fed thereto, and a plurality of selectable switches each having first and second inputs, wherein said first input of each selectable switch is connected to a respective output of said stages of said first shift register means, and said second input of each selectable switch is connected to a respective output of said stages of said second shift register means, and wherein an output of each of said selectable switches is connected to said first input of each of said scaling means, said selectable switches switching samples of said delayed received signal from either said first or said second shift register means in accordance with said correlation period, wherein delay shifts introduced into said received signal are substantially the same for each correlation period.

21. A code acquisition circuit as claimed in claim 20, wherein said first and second shift register means each comprises n stages, said plurality of scaling means comprises n scaling means, and said plurality of selectable switches comprises n selectable switches, and wherein each sample of said delayed received signal present in said stages of said first and second shift register means is scaled by a corresponding sample representative of one of said chips of said n-chip spreading code.

22. A code acquisition circuit for acquiring code synchronization between an n-chip spreading code of a received spread spectrum radio signal and an n-chip local reference code generated by a code generator within a receiver of said radio signal, the code acquisition circuit comprising:

variable delay means for introducing a delay shift into said received radio signal said delay shift being a randomly selected fraction of one chip period for randomly varying chip timing position of said received radio signal;

correlator means for correlating n-chips of the local reference code with n-samples of said received signal, said n-samples being taken at sampling intervals determined by said chip timing position and a chip rate for said delayed received signal, said correlator means being provided with means for generating a correlation signal representative of a result of said correlation;

code acquisition controller means for maintaining said delay shift in dependence upon said correlation signal; and variable frequency offset means for introducing a frequency offset into said delayed received radio signal in accordance with an offset control signal fed thereto from said code acquisition controller means and arranged to maintain said frequency offset for at least one correlation period to provide both code and frequency acquisition.

23. A code acquisition circuit as claimed in claim 22, wherein said correlator means further generates a frequency lock signal indicative of said frequency offset appertaining to said correlation signal exceeding a predetermined threshold.

24. A code acquisition circuit as claimed in claim 23, further comprising frequency locking means for maintaining said frequency offset in dependence upon said frequency lock signal.

25. A code acquisition circuit for acquiring code synchronization between an n-chip spreading code of a received spread spectrum radio signal and an n-chip local reference code generated by a code generator within a receiver of said radio signal, the code acquisition circuit comprising:

variable delay means for introducing a delay shift into said received radio signal, said delay shift being a randomly selected fraction of one chip period for randomly varying chip timing position of said received radio signal;

correlator means for correlating n-chips of the local reference code with n-samples of said delayed received signal, said n-samples being taken at sampling intervals determined by said chip timing position and a chip rate for said delayed received signal, said correlator means being provided with means for generating a correlation signal representative of a result of said correlation; and code acquisition controller means for maintaining said delay shift in dependence upon aid correlation signal, said code acquisition controller means comprising a random number generator which generates a control signal in accordance with a random number generated thereby, said control signal being communicated to said variable delay means to introduce said delay shift in accordance therewith.

26. A code acquisition circuit as claimed in claim 25, further comprising means for introducing a further delay shift into said received signal, said further delay comprising substantially at least one chip period with respect to the local code.

27. A code acquisition circuit as claimed in claim 26, wherein said means for introducing said further delay shift comprises second variable delay means which introduces said further delay shift in accordance with a second control signal generated by said random number generator.

28. A code acquisition circuit as claimed in claim 26, wherein said means for introducing said further delay shift comprises said variable delay means which introduces both said delay shift and said further delay shift in combination with said control signal and a further control signal.

29. A code acquisition circuit as claimed in claim 25, further comprising correlation comparator means for comparing said correlation signal with a predetermined correlation threshold and for generating a code lock signal representative of said comparison.

* * * * *